Sept. 4, 1934.   H. ANGEL   1,972,326
SYSTEM FOR AUTOMATICALLY DETECTING ERRORS IN TELEGRAPH RECEPTION
Filed April 28, 1933   4 Sheets-Sheet 1

Inventor
Herbert Angel

Patented Sept. 4, 1934

1,972,326

UNITED STATES PATENT OFFICE 1,972,326

SYSTEM FOR AUTOMATICALLY DETECTING ERRORS IN TELEGRAPH RECEPTION

Herbert Angel, Brooklyn, N. Y., assignor to The Western Union Telegraph Company, New York, N. Y., a corporation of New York Application April 28, 1933, Serial No. 668,440

11 Claims. (Cl. 178—3)

This invention relates to automatic printing telegraph systems and pertains to means for automatically detecting errors in the received messages.

It is well known to telegraph operators and engineers that errors occur in the received messages which may not be obvious and hence may not be detected by the receiving operator, the errors being due to line or other irregularities. My invention provides a means for automatically detecting such errors and immediately calls attention to any word that has been incorrectly received or mutilated by causing a signal or character to be printed after the word. It will be evident that this invention increases considerably the output of traffic over circuits which handle cipher messages by eliminating the necessity of transmitting these messages twice as is customary for confirmation purposes.

In carrying out this invention I provide an arrangement for mechanically counting only the number of selecting elements in each transmitted word consisting of selecting and non-selecting elements and automatically transmitting a "tracer" character at the end of the word which represents the number of transmitted selecting elements. At the receiving end of the line or cable, a similar device counts the selecting elements received and if the latter agrees with the number transmitted, the tracer signal is ineffectual, but if there is a disagreement between the two counters, the tracer signal causes the printing of a character to indicate that an error occurred in the preceding word.

In the following description I shall refer to the accompanying drawings, in which—

Figure 1:
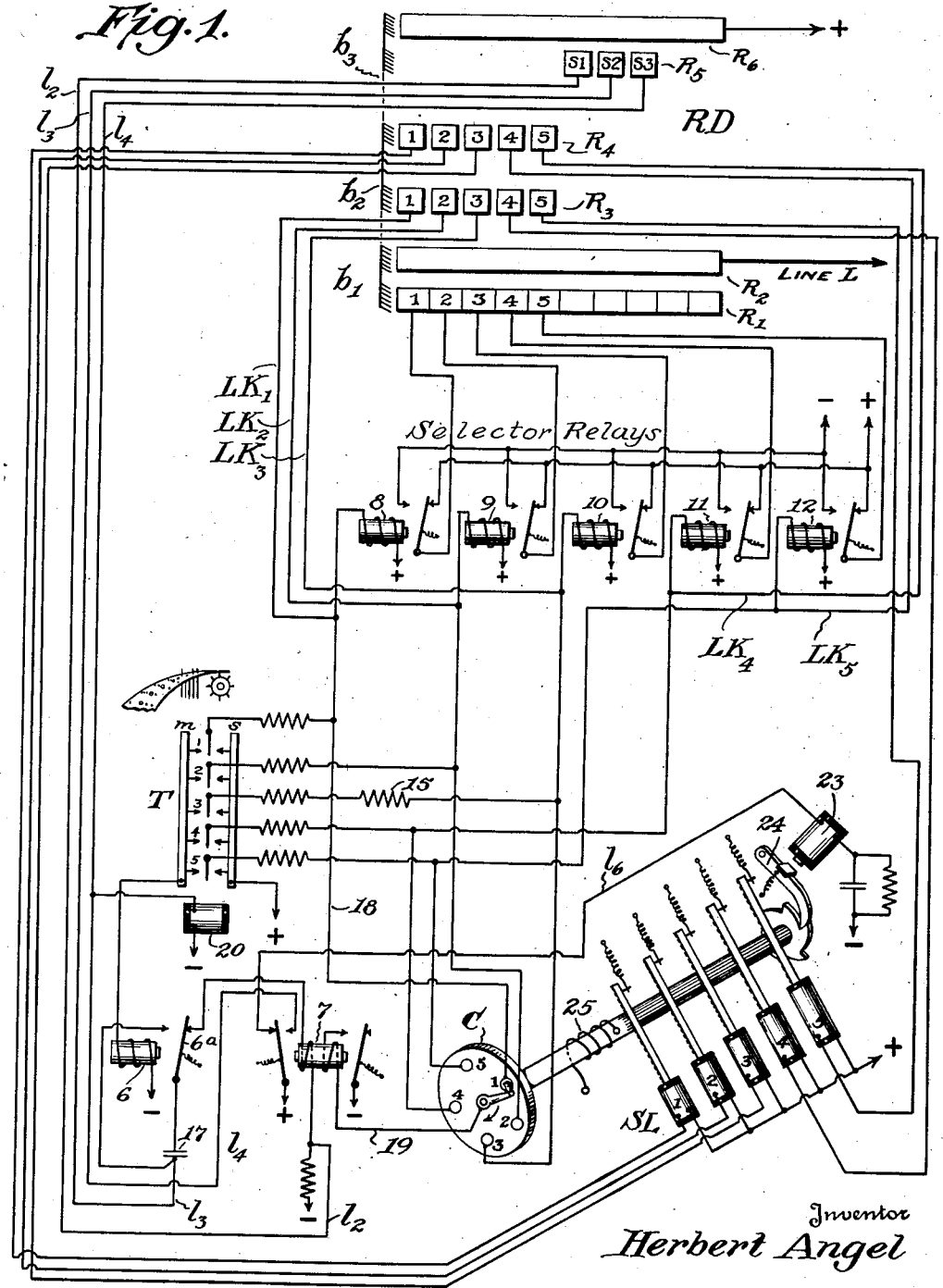
Figure 1 is a schematic diagram of a telegraph transmitting apparatus embodying means for counting the selecting elements and sending a tracer signal according to my invention.

Referring to Fig. 1, the rotary distributor RD is of the usual type and operates to transmit the code combinations of impulses from the well known perforated tape transmitter T of the type shown in Benjamin Patent No. 1,298,440 granted March 25, 1919.

As previously stated, means is provided to transmit a character after each word transmitted which coacts with mechanism at the receiving end to indicate when an error is transmitted immediately after the "space" character which follows a word.

I utilize the "word-space" character which follows each word, to select a path for the passage of an energizing impulse which causes the transmission of a tracer character.

For example, assume that a word has been transmitted to the line L over the rings $R_1$ and $R_2$ of the rotary distributor under the control of the tape transmitter T, and that the "word-space" character is the next character on the perforated tape. The "word-space" code is element 3 "marking" and the other elements "spacing". The marking bar of the tape transmitter is connected to marking (negative) battery through the winding of relay 6. This relay is energized for each code character in which the tape perforations permit any of the tongues or pins 1, 2, 4 or 5 to engage the marking bar but is not energized when tongue 3 is the selecting element because the additional resistance 15 in circuit therewith reduces the current below the energizing value. Hence when the perforation for the "word-space" code character is set up in the transmitter, causing tongue 3 to engage the marking bar, the relay 6 will not be energized and its tongue $6^a$ will engage its back contact, thereby selecting and ensuring a path for the energizing impulse that shall cause a tracer character to follow the "word-space" character. Although the relay 6 is not energized when the transmitter tongue 3 engages the marking bar, the relay 10 of the group associated with the segments of ring $R_1$ is energized and sets up a marking potential on segment 3. Hence as the brush $b_1$ passes over the segments, the "word-space" code character, i. e., element 3 selecting, is transmitted over the line. Brush $b_3$ next engages segment $s_1$ of ring $R_5$, closing a circuit through conductor $l_2$ which short-circuits relay 7. As brush $b_3$ engages segment $s_2$ a circuit is closed through conductor $l_3$ which energizes relay 7 through condenser 17 and tongue $6^a$ of relay 6. Relay 7 locks itself through its right hand tongue, the arm and contact 1 of the counter C, conductor 18 and winding of relay 8. The latter places marking (negative) polarity on transmitting segment 1 of ring $R_1$. Relay 7 also locked operating magnet 20 of the tape transmitter through its left hand tongue and front contact which withdraws all of the tongues of the tape transmitter and connects them to spacing bar S, where they are held until the rotary distributor brushes make a complete revolution. During this revolution the "tracer" character with element 1 as the selecting element is transmitted over the line. When the brush $b_3$ again engages segment $s_1$ a circuit is closed through conductor $l_2$ which short-circuits relay 7, opening the circuit to the counter and releasing the transmitter magnet 20.

As the brush $b_3$ moves over the segment $s_2$ a circuit is closed over conductor $l_3$ but inasmuch as the condenser 17 has not yet been discharged the relay 7 is not energized. Brush $b_3$ now engages segment $s_3$, closing a circuit over conductor $l_4$ and operating the transmitter magnet 20 which steps the tape in the transmitter to the next character.

In this manner after the "word space" which is transmitted at the end of every word, a tracer signal is sent having the first, second, third, fourth or fifth element as a selecting element, depending upon which contact of the counter C is closed at the end of the word.

For the purpose of illustration, I have shown a simple form of counter which is stepped around by the operation of solenoids SL, 1 to 5 operated from segments 1 to 5 of distributor rings $R_3$, $R_4$, these segments being energized from the tongues of the transmitter T when they engage the marking bar M, via the leak conductors $LK_1$ to $LK_5$. I have indicated that the solenoid plungers have a frictional engagement with the arbor of the counter and that they are retracted by means of springs. The solenoids SL are so designed that the counter C is operated one step by solenoid 1, two steps by solenoid 2, three steps by solenoid 3, four steps by solenoid 4 and five steps by solenoid 5. Thus if a word, including the "word space" contains the following selecting elements viz. elements 1, 2, 1, 4, 5, 2, 3, 4, 1, 4, 1, 3, (representing in telegraph code ABCDE space), the counter will be stepped 31 teeth so that its brush will rest upon contact No. 1. Accordingly a tracer signal will be transmitted with the first element as the selecting element.

The reset magnet 23 which lifts the pawl 24 and permits the winding spring 25 to return the counter C to zero position, is actuated over the conductor $l_6$ by a circuit through the left hand tongue of relay 7 which is deenergized after the tracer signal has been transmitted by the engagement of the brush $b_3$ with the segment $s_1$ as previously described.

Figure 2:
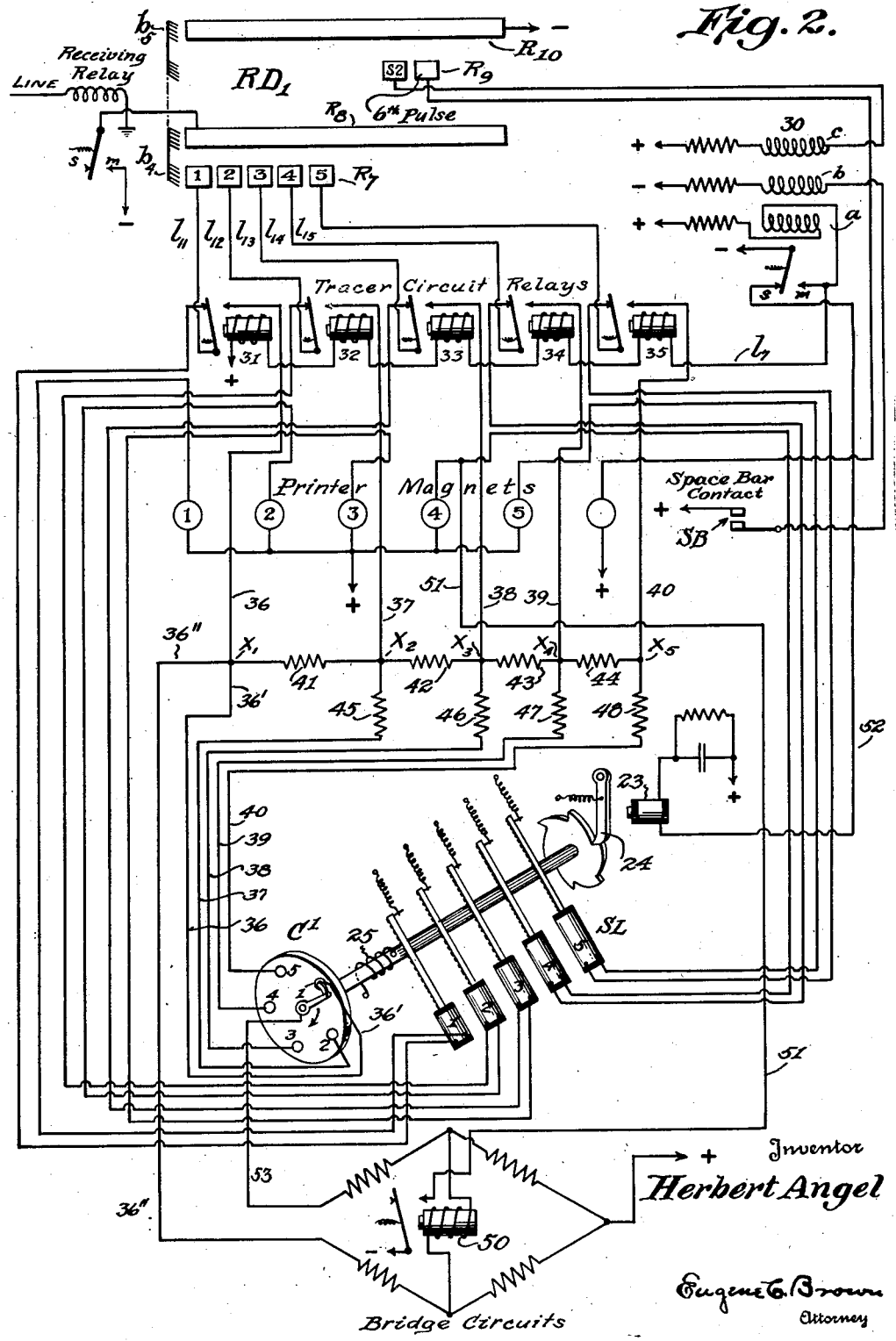
Figure 2 is a diagrammatic illustration of the apparatus at the receiving end of the line or cable and embodying means for counting the received selecting elements and means responsive to a tracer signal to indicate whether or not the preceding word has been correctly received.

The apparatus at the receiving end of the line or cable is illustrated in Figure 2. The signals coming in over the line are received by the receiving relay and transferred to the multiplex rotary distributor $RD_1$ in the usual manner and when the "word space" character is received at the end of each word, a circuit is selected or set up for receiving the tracer signal. In a manner similar to that described at the sending end, the received selecting elements operate a counter step by step, which indicates the sum of the numbers of the selecting elements received. If the counters at the sending and receiving ends are operated the same number of steps, the tracer signal will produce no effect at the receiving end. But if, for example, the twelve selecting elements above specified were transmitted and, due to some irregularity in the transmission or reception, the selecting elements actually received caused the receiving counter C' to stop with the brush on contact No. 5 instead of on contact No. 1, a circuit is thereby established locally which causes a character to be printed, thereby indicating that the preceding word has been mutilated.

Assume again that a word has been received containing the twelve selecting elements previously specified, including the "word space" element, and that the brush arm of the counter C' has therefore been stepped 31 teeth so that the brush rests upon contact No. 1. When the word space character arrived, in which the third element is the selecting element, the space bar of the printer, not shown, closed the contacts SB as usual, thereby energizing the winding $b$ of control relay 30, causing its tongue to engage its right hand marking contact, which locks itself through its winding $a$. A circuit is thus closed through conductor $l_7$ which energizes the tracer circuit relays 31 to 35, moving their tongues against their front contacts, thereby switching the conductors $l_{11}$ to $l_{15}$ from the printer magnets to the tracer circuits.

The next character to be received is the tracer character, in which the selecting element has been assumed to be the first element. Accordingly when the receiving relay moves its tongue against the right hand marking contact, current flows from negative battery through distributor bar $R_8$, brush $b_4$, segment 1 of ring $R_7$, conductor $l_{11}$, tongue of relay 31, conductor 36 to point $X_1$ where it splits, the current flowing equally over conductor 36', contact 1 of counter C' and conductor 53 to the bridge, the other portion flowing through conductor 36 to the bridge. Hence the bridge relay 50 is not affected. If, however, the counter C' had been stepped to contact No. 5, due to some irregularity in the reception, the local bridge circuits would be unbalanced because the circuit from the split point $X_1$ to the contact 5 of the counter would include the resistances 41 to 44 and 48, whereas the circuit from the split point $X_1$ through conductor 36" to the other side of the bridge would remain as before stated. Due to the unbalance in the bridge arms, the bridge relay 50 will be energized and its tongue will close a circuit through its front contact and conductor 51 to energize printer magnet No. 4, this magnet being arbitrarily chosen to print an indication at the end of the preceding word, thereby indicating that said word was incorrectly received. When the brush $b_5$ passes over segment $s_2$ of ring $R_9$ a circuit is closed through winding $c$ of control relay 30 which restores its tongue to spacing contact, thereby closing a circuit through conductor 52 and the reset magnet 23 of the counter, lifting the pawl 24 to permit the coiled spring 25 to return the counter to zero position in condition to count the selections of the next word.

The windings of the counter solenoids SL—1 to 5, are included in the circuits of the respective printer magnets and are operated each time a selecting element is received, except the tracer selecting element, the circuits at that instant being open at the front contacts of the relays 31 to 35, the tongues of these relays having been moved to their front contacts by the selecting element of the "word space" signal which immediately preceded the tracer signal, as previously explained.

The resistances 41 to 48 are for the purpose of balancing the bridge circuits in case the tracer signal is closed through contacts 2, 3, 4 or 5 of the counter. For example, if the tracer signal included the second element as the selecting element, the impulse from the receiving relay would pass over the conductor $l_{12}$ and the tongue and front contact of relay 32 to the split point $X_2$ and thence through resistance 41 and conductor 36" to one side of the bridge and from the split point through resistance 45, conductor 37, contact 2 and brush arm of the counter to the other side of the bridge.

Figure 3:
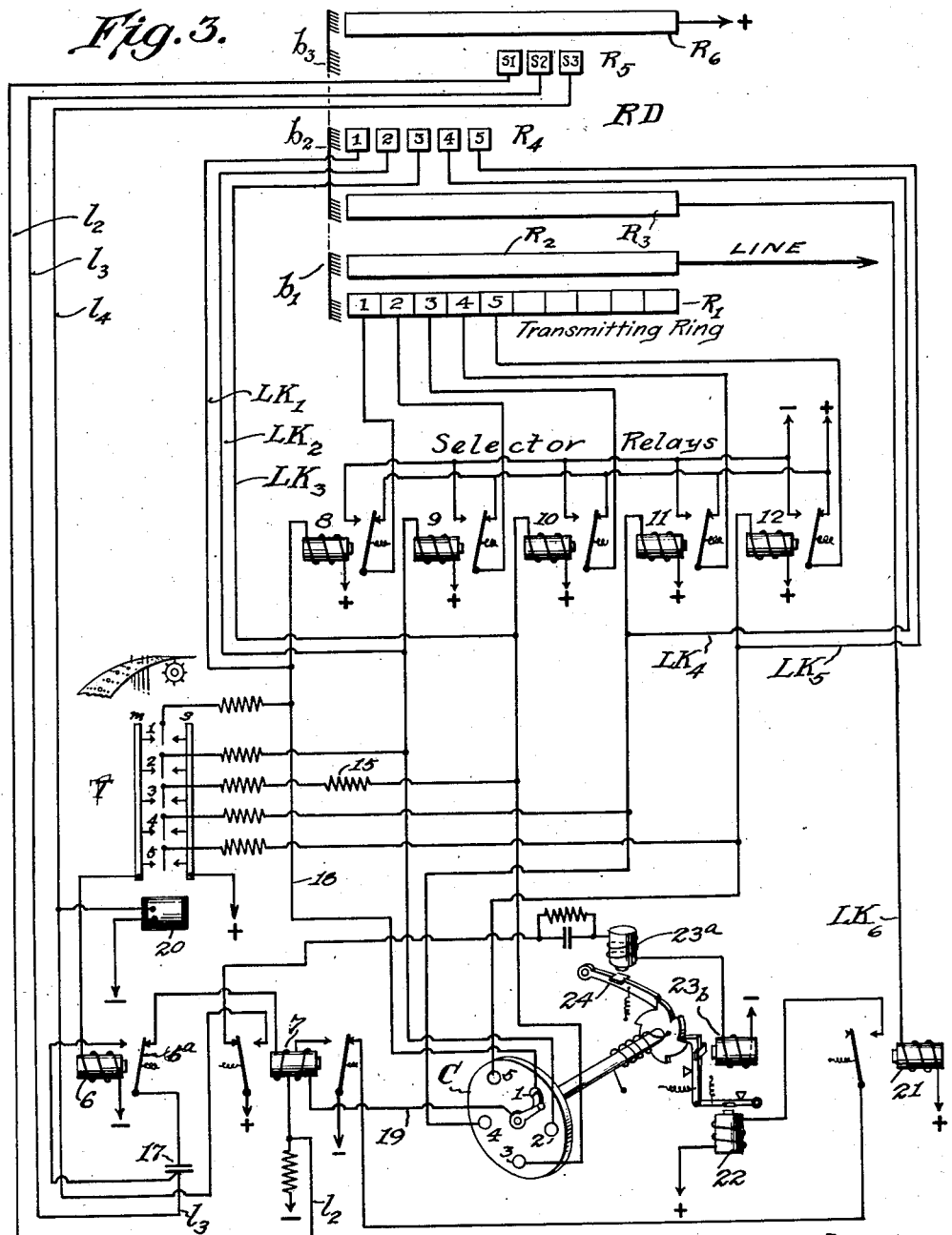
Figure 3 is a modification of the arrangement illustrated in Fig. 1.

Figure 3 illustrates apparatus at the transmitting station which differs in certain details from that shown in Fig. 1. Instead of operating the counter by five solenoids, one in each leak circuit, in parallel with the selector relays, the stepping magnet 22 which operates the counter, is actuated by a single stepping control relay 21 in the common return conductor $LK_6$ from the distributor ring $R_3$. In this manner the counter will be stepped only one tooth for each selector impulse transmitted to line.

Thus if the word including the "word-space" character contains eleven selecting elements, the counter is stepped to its contact No. 1 and hence a tracer signal having the first element as a selecting element will be transmitted. If the word including the "word-space" character contains twelve selecting elements, then contact No. 2 of the counter is engaged by the counter brush at the end of the word and a tracer signal with the second element as the selecting element is transmitted.

Figure 4:
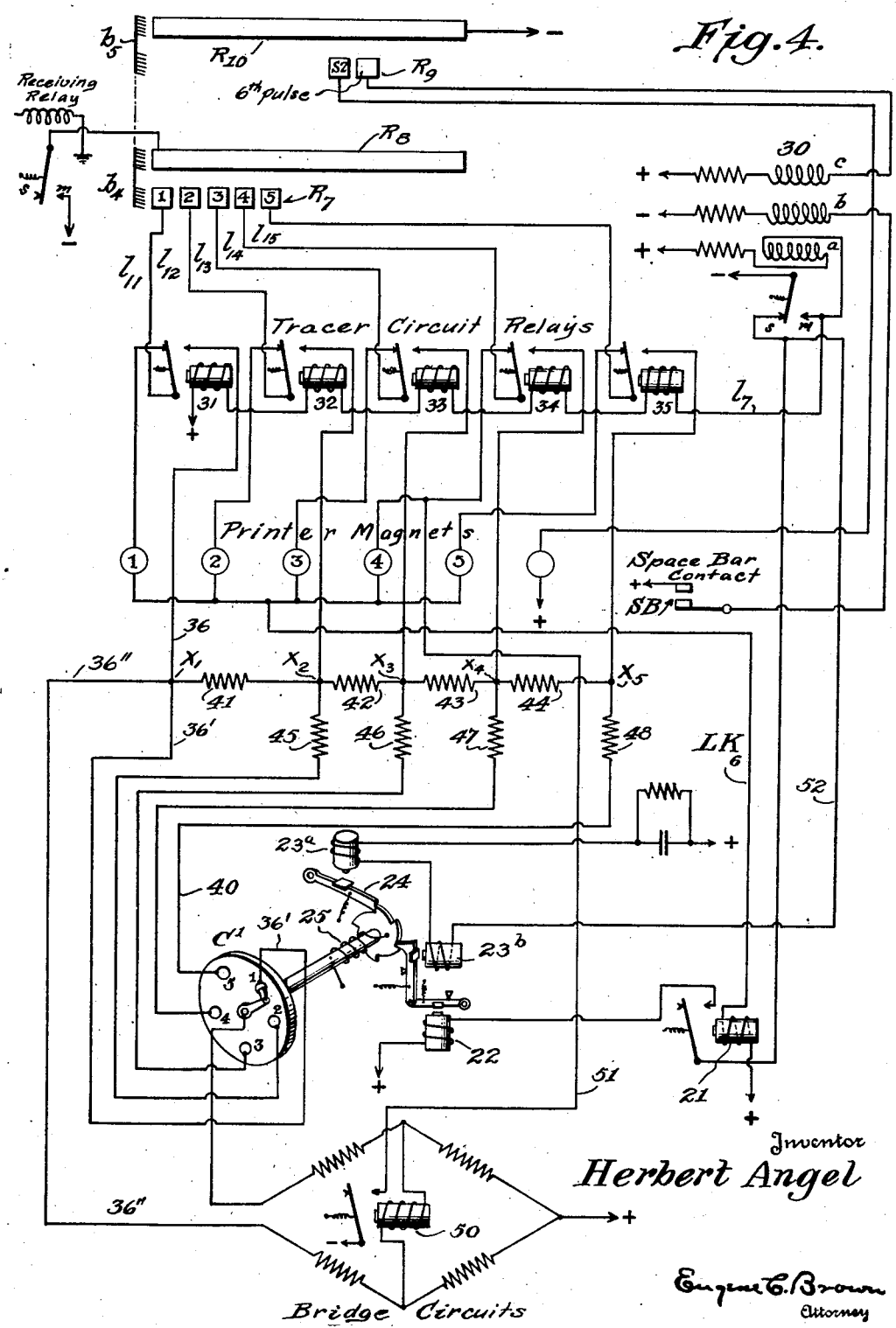
Figure 4 is a modification of the apparatus at the receiving end or station corresponding to the transmitting arrangement of Fig. 3.

Figure 4 illustrates apparatus at the receiving station which differs in the manner of operating the counter from that shown in the arrangement of Fig. 2 in substantially the same manner as the arrangement of Fig. 3 differs from that of Fig. 1.

As in the transmitting arrangement shown in Fig. 3, the received selecting elements operate a similar counter C' step by step to indicate the number of selecting elements actually received. As explained in describing Figs. 1 and 2, if the counters at the sending and receiving ends are operated the same number of steps, the tracer signal will produce no effect at the receiving end because equal currents are transmitted to the bridge circuits as previously described. Thus if the transmitted word including the "word-space" character contained eleven selecting elements the counter should stop with its brush resting on contact No. 1. If, however, due to some irregularity, the counter had stepped only to contact No. 5, the local bridge circuits would be unbalanced because the branch circuit from the split point $X_1$ to the bridge via the contact No. 5 and brush arm of the counter would include the resistances 41 to 44 and 48, while the conductor 36" from the split point $X_1$ to the bridge contains no resistances. Consequently the bridge relay 50 would operate and close a circuit through conductor 51 to operate printer magnet No. 4 and print an indicating character after the word, thereby indicating that it had been incorrectly received.

The tracer signal may, instead of printing a character, cause a bell to ring or a lamp to light. The tracer signal may, of course, be punched in the tape by suitable automatic means provided in the perforator, or a counter may indicate to the operator what tracer signal should be perforated in the tape or be manually transmitted. It is obvious also that the tracer signal may indicate the number of non-selecting elements instead of the selecting elements that are transmitted. It is also obvious that counters of a synchronous motor type may be employed to accomplish the same result or a stepping relay device such as used in the telegraph art may be employed.

While I have in the above description disclosed what I believe to be preferred and practical embodiments of my invention, it is to be understood that the specific details described are not limitative in their effect upon the invention, but merely illustrative, except insofar as they are expressly prescribed by the terms of the appended claims.

I claim:

1. The method of automatically indicating a discrepancy between the transmission and reception over a telegraph line or cable of intelligence signals, composed of selecting and non-selecting elements, which comprises recording the number of the selecting elements at both sending and receiving stations and actuating an indicating device over a path conditioned by unlike records at said stations.

2. The method of detecting errors in the reception of intelligence signals of code combinations of selecting and non-selecting conditions transmitted over a telegraph system, which consists in making a record in response to the transmission and a record in response to the reception of each selecting condition, preparing a path after the reception of each code combination depending upon said transmission and reception, and causing an indication depending upon the path thereby determined.

3. The method of detecting errors in the reception of intelligence signals of code combinations of selecting and non-selecting conditions transmitted over a telegraph system, which consists in making a record in response to the transmission and a record in response to the reception of each selecting condition, preparing a path after the reception of each code combination depending upon said transmission and reception and transmitting a tracer signal over said path.

4. The method of detecting errors in the reception of intelligence signals of code combinations of selecting and non-selecting conditions transmitted over a telegraph system, which consists in making a record in response to the transmission and a record in response to the reception of each selecting condition, transmitting a special signal after each intelligence signal, causing said signal to prepare a circuit over one path when said records correspond and over another path when said records disagree, transmitting a tracer signal over the prepared path and causing an indication to be made only when said signal traverses the latter path.

5. The method of detecting errors in the reception of intelligence signals of code combinations of selecting and non-selecting conditions transmitted over a telegraph system; which consists in making a record in response to the transmission and a record in response to the reception of each selecting condition, transmitting a special signal after each intelligence signal, causing said signal to prepare a circuit at the receiving end of the system over a divided path which is balanced when said records correspond and which is unbalanced when said records disagree, transmitting a tracer signal over the prepared circuit and causing an indication in response to an unbalanced condition in said circuit.

6. The method of indicating the erroneous reception of a word or symbol transmitted over a telegraph system by signal elements of selecting and non-selecting character, which comprises conditioning a tracer circuit at the receiving end of the system after the reception of each word or symbol in accordance with the number of received signal elements of one character and causing an indicator to respond to a signal over said tracer circuit only when said number disagrees with the transmitted elements of the same character.

7. The method of indicating the erroneous reception of a word or symbol transmitted over a telegraph system by signal elements of selecting and non-selecting character, which comprises preparing a tracer circuit after the transmission of each word or symbol, over a path at the sending and receiving ends of the system depending upon the number of selecting or non-selecting elements transmitted and received respectively, and causing an indicator at the receiving end to respond to a signal over said circuit only when said transmitted number disagrees with said received number.

8. A telegraph system comprising a transmitter for sending code combinations of selecting and non-selecting conditions, means for counting the number of transmitted selecting conditions, means for transmitting a special signal having a predetermined selecting condition after each transmitted code combination, and means for sending a tracer signal having a selecting condition determined by the number of transmitted selecting conditions.

9. A telegraph system comprising a transmitter for sending code combinations of selecting and non-selecting conditions, means for counting the number of transmitted selecting conditions, means for transmitting a special signal having a predetermined selecting condition after each transmitted code combination, means for sending a tracer signal having a selecting condition determined by the number of transmitted selecting conditions, a receiving apparatus responsive to the various combinations of selecting conditions, a counter operated by each received selecting condition, and an indicator device operatively connected to said counter and responsive to said tracer signal when there is a disagreement between the receiving counter and the transmitting counter.

10. In a telegraph system, a tape transmitter for sending code combinations of impulse conditions consisting of selecting and non-selecting arrangements, a counter device actuated step by step under the control of certain of the transmitted impulses, means for transmitting a predetermined signal impulse after each code combination and locking the tape transmitter during the transmission thereof, receiving apparatus responsive to said code combinations of impulses, a counter device operated by each received impulse corresponding to the above mentioned counter controlling impulses, said receiving apparatus having means actuated by said signal impulse following each code combination to condition a tracer circuit operatively connected to said counter device, and an indicator responsive to a tracer signal transmitted over said tracer circuit.

11. In a telegraph system, a tape transmitter for sending intelligence signals of code combinations of selecting and non-selecting elements, a counting device actuated step by step under the control of the transmitted selecting elements, a "word space" signal having a predetermined selecting element, receiving apparatus responsive to the received selecting elements, a counting device actuated by each received selecting element, said receiving apparatus having means operated by said "word space" signal to condition a local divided circuit including a balanced bridge, said counter being connected in one branch of said divided circuit, an indicating device connected across said bridge, and means to unbalance said divided circuit when there is a discrepancy between said counting devices, and means to transmit a tracer signal over said divided circuit to thereby actuate said indicating device when there has been an error in the received intelligence.

HERBERT ANGEL.